[11] 3,580,335

| [72] | Inventors | Joseph C. Allen;<br>Valery N. Bednarski, Bellaire; Russell W. Hall, Jr., Houston, Tex. |
|---|---|---|
| [21] | Appl. No. | 886,785 |
| [22] | Filed | Dec. 19, 1969 |
| [45] | Patented | May 25, 1971 |
| [73] | Assignee | Texaco Inc.<br>New York, N.Y. |

[54] OIL RECOVERY BY A COMBINATION OF SOLUTION GAS DRIVE AND WATERFLOODING
4 Claims, No Drawings

[52] U.S. Cl. .................................................. 166/263, 166/275
[51] Int. Cl. ..................................................... E21b 43/22
[50] Field of Search ........................................... 166/275, 268, 274, 263

[56] References Cited
UNITED STATES PATENTS

| 1,787,972 | 1/1931 | Doherty ........................ | 166/263 |
|---|---|---|---|
| 2,412,765 | 12/1946 | Buddrus et al. ................ | 166/263X |
| 2,827,964 | 3/1958 | Sandiford et al. .............. | 166/274 |
| 3,032,101 | 5/1962 | Woertz et al. ................. | 166/263 |
| 3,134,434 | 5/1964 | Wooddy, Jr. .................. | 166/263 |
| 3,251,412 | 5/1966 | Cooke, Jr. et al. ............. | 166/275 |
| 3,442,331 | 5/1969 | Fulton et al. .................. | 166/263 |

OTHER REFERENCES

Elkins, " Cyclic Waterflooding the Sprayberry Utilizes ' End Effects' to Increase Oil Production Rate" , JOURNAL OF PETROLEUM TECHNOLOGY, August 1963, (pages 877—884) 166—263.

*Primary Examiner*—Stephen J. Novosad
*Attorneys*—Thomas H. Whaley and Carl G. Ries ABSTRACT: Improved oil recovery from an oil-bearing reservoir is obtained by a combination of solution gas drive and water flooding whereby the reservoir is produced by solution gas drive until the pressure of the reservoir is reduced below the bubble point pressure and a critical gas saturation is established, and thereafter the reservoir is produced by a water flood until the rate of oil production reaches a predetermined value or termination point, whereafter the cycle is repeated.

OIL RECOVERY BY A COMBINATION OF SOLUTION GAS DRIVE AND WATERFLOODING

FIELD OF THE INVENTION

This invention relates to an improved method for the recovery of oil from an oil-bearing reservoir whereby the reservoir is produced by solution gas drive to the point at or near the critical gas saturation, followed by a waterflood to the point where the rate of oil production reaches predetermined termination point, after which the cycle is repeated.

DESCRIPTION OF THE PRIOR ART

Primary production of oil from subterranean oil-bearing reservoirs is normally obtained by exploiting the natural energy of the reservoir in the form of water drive, gas cap drive, solution gas drive or combinations thereof. These various forms of energy provide the driving force necessary for the production of oil from the reservoir without the necessity of providing energy from an external source.

A gas drive reservoir is one in which the major source of energy driving the oil toward a production well is associated with the gas dissolved in the oil or in a free gas zone which may exist in the reservoir. If a reservoir contains gas in solution in oil and there is no gas cap initially, the production of oil from the reservoir is termed a solution gas drive. As long as the pressure within the reservoir is at a sufficiently high level, gas initially in solution remains in solution in the oil. However, as withdrawal of oil is continued, the pressure of the reservoir may be permitted to decline. When the reservoir pressure has declined sufficiently, bubbles of free gas develop in the reservoir and separate out of solution. The pressure at which gas separation occurs is known as the "bubble point pressure" for the particular reservoir. The reservoir then develops a condition which is referred to as one of free gas saturation, wherein there exists within the reservoir in both the minor and major flow channels or interstices, a quantity of free gas. Initially, the quantity of free gas exists as a discontinuous phase and is immobile. As the free gas saturation increases, the evolved bubbles coalesce and form a continuous gas phase. At this point, which is known as the critical gas saturation, gas permeability exists and free gas flows through the reservoir with little or no displacement of oil.

In order to obtain additional energy, it is common practice to undertake waterflooding after solution gas drive or pressure depletion of a reservoir, at the time when the pressure of the reservoir has decreased to a level indicative that the energy within the reservoir has been substantially expended. Water is then injected into the reservoir through one or more injection wells and forced toward the production wells thereby resulting in displacing additional reservoir oil toward the production wells from which it is produced.

When water is injected into a reservoir in a conventional waterflood, the capillary and viscous forces present result in the displacement and recovery of less than all of the oil in place. The flow of water occurs principally through the larger channels of the matrix of the reservoir which results in bypassing oil in some of the smaller interstices, wherein the openings therefrom are of such a capillary nature as to prevent their flooding by water.

Processes for the still further recovery of oil after waterflooding have been proposed which involve the repressuring of the reservoir by gas injection, followed by pressure depletion of the reservoir whereby the reservoir is produced without further fluid injection. Other proposals for obtaining further oil recovery have included repressuring the reservoir with water.

However, in many instances the repressuring of the reservoir by water injection, eliminates most of the free gas saturation which may have been established during the solution gas drive with the result that the realized recovery is less than that which would have been obtained from waterfloods performed in the presence of free gas saturation. In yet other instances, solution gas drives have been conducted to the point where a continuous gas phase is formed, which results in an undesirable increase in gas saturation and little further production of oil from the reservoir upon subsequent waterflooding.

SUMMARY OF THE INVENTION

This invention relates to a method for the recovery of oil from an oil-bearing reservoir whereby the reservoir is produced by solution gas drive to a point within the critical gas saturation of the reservoir and thereafter the reservoir is produced by waterflood to a point where the rate of oil production has reached a predetermined termination point and thereafter the cycle is repeated.

There is an optimum value for the reservoir pressure that occurs during a solution gas drive for a single pressure decline leading to the formation of a free gas saturation in the reservoir prior to waterflooding which leads to improved oil recovery. Accordingly, it is the object of this invention to provide an improved method for recovering oil from an oil-bearing reservoir by the proper utilization of this optimum pressure value by a combination of a solution gas drive and a waterflood procedure.

DESCRIPTION OF THE PREFERRED EMBODIMENT

By the method of invention, a solution gas drive and a subsequent waterflood are utilized whereby the optimum value of a single pressure decline for oil recovery is exploited. This optimum value occurs below the bubble point pressure, but within the limits for critical gas saturation of the reservoir. Generally, the critical gas saturation is in the range of about 2 to about 10 percent of the void volume of the reservoir.

It is postulated that improved recovery of a reservoir having dissolved gas therein is realized by this invention by the occurrence of the following sequence of events. Production of the reservoir oil is obtained by solution gas drive whereby the pressure of the reservoir is permitted to decline to a level slightly below the bubble point pressure, but at which the reservoir still has a critical gas saturation present. This lowering of the pressure causes evolution of gas from the oil, resulting in expulsion of some of the oil from the small capillaries or interstices of the reservoir into the major flow channels. After the critical gas saturation has been reached, the solution gas drive is terminated and a waterflood is initiated at the existing lower pressure of the reservoir whereby a more efficient displacement of the reservoir oil is effectuated due to the existence of the finite gas saturation in the flow channels of the reservoir.

Thereafter, when the rate of oil production has reached a predetermined termination point at which continued waterflooding is no longer feasible, the water injection is terminated. The predetermined termination point is indicated principally by the rate of oil production for the given operation and is determined by practices well known in the art. For a given waterflood, the termination point is dependent on the particular reservoir and operating conditions that are being employed. Generally, the point is indicated by a rapid decline in the rate of oil production as compared with the rate of water production or stated in another way by an increase in the water-to-oil ratio (WOR) of the produced fluids. For example, for a given operation, the increase in the WOR to values approaching 100 may be taken as the predetermined point at which water injection should be terminated.

A solution gas drive is again initiated whereby the pressure of the reservoir is again permitted to decline during which time the production wells are produced. The solution gas drive is continued to the point where the critical gas saturation again is reached at the lower pressure of the reservoir. The solution gas drive is then terminated and a waterflood is again undertaken. These alternate steps are continued to the point where the abandonment pressure of the reservoir is reached, at which point the energy of the reservoir is substantially expended.

To demonstrate the invention, a series of laboratory tests was performed in which cores from the Pembina Field, Alberta, Canada, were machined and suitably mounted in high pressure flood pots. In each core, an initial water and oil saturation was established of 11.6 percent and 88.4 percent respectively. The initial pressure was 2,400 p.s.i.g. The tests were then conducted as shown in the following table.

TEST 1.—ALTERNATE DEPLETION AND WATERFLOOD

| | Pressure at end of step, p.s.i.g. | Percent oil recovery | Percent fluid saturations at end of step (by volume) | | |
|---|---|---|---|---|---|
| | | | Water | Oil | Ga |
| Solution gas drive | 1,200 | 12.0 | 11.6 | 76.2 | 12.2 |
| Waterflood | 1,200 | 40.1 | 36.6 | 51.9 | 11.5 |
| Solution gas drive | 900 | 45.0 | 36.6 | 47.2 | 16.2 |
| Waterflood | 900 | 58.6 | 50.1 | 35.5 | 14.4 |
| Solution gas drive | 600 | 59.6 | 47.2 | 34.4 | 18.4 |
| Waterflood | 600 | 61.1 | 50.6 | 33.1 | 16.3 |
| Solution gas drive | 300 | 61.9 | 44.7 | 32.1 | 23.2 |
| Waterflood | 300 | 62.5 | 49.9 | 31.6 | 18.5 |
| Solution gas drive, depletion to | 0 | 63.1 | 42.7 | 30.7 | 26.6 |

TEST 2.—CONVENTIONAL WATERFLOOD

| | | | | | |
|---|---|---|---|---|---|
| Waterflood (1 p.v.) | | 54.2 | 59.4 | 40.6 | 0.0 |
| Solution gas drive | 0 | 57.8 | 40.2 | 35.2 | 24.6 |

These tests showed that the combination of solution gas drive and waterflooding in alternate steps resulted in an oil recovery of 63.1 percent, whereas the use of a waterflood and a single pressure depletion resulted in an oil recovery of 57.8 percent, showing an 8.3 percent improvement in recovery by the method of the invention.

One suggested procedure for applying this invention to a reservoir saturated with gas at the reservoir pressure would comprise the following steps: (a) produce the reservoir by solution gas drive until the pressure is below the bubble point pressure, but within the critical gas saturation; (b) terminate the solution gas drive and initiate a waterflood by the injection of water; (c) waterflood the reservoir to a termination point indicated by a rapid rise in the rate of water production as compared to the rate of oil production; (d) terminate the waterflood and again produce the reservoir by solution gas drive to the point where pressure of the reservoir has again decreased below the bubble point pressure, but is within the critical gas saturation; (e) repeat the above steps until the abandonment pressure of the reservoir is reached.

It is within the scope of the invention to apply the procedure to undersaturated reservoirs, wherein the initial steps of solution gas drive is preceded by the step of repressuring by gas injection of the formation so as to establish a gas-saturated reservoir prior to the solution gas drive.

It is also within the scope of the invention to utilize a viscous waterflood wherein an improved mobility ratio can be effected by using thickeners which are known in the art in the injected water during the waterflood steps of the procedure.

I claim:

1. A method of recovering oil from an oil-bearing reservoir traversed by at least one injection well and one production well, comprising the steps of:
   a. Producing said reservoir via said production well by solution gas drive and pressure decline to a point below the bubble point pressure, but within the critical gas saturation of said reservoir at the existing pressure of said reservoir.
   b. Terminating said solution gas drive and injecting water into said reservoir via said injection well while maintaining said existing pressure on said reservoir and simultaneously producing said reservoir from said production well to a point where the rate of oil production has reached a predetermined termination point;
   c. Terminating said water injection and producing said reservoir via said production well by solution gas drive and pressure decline to a point below the bubble point pressure, but within the critical gas saturation of said reservoir at the then existing pressure of said reservoir;
   d. Terminating said solution gas drive and injecting water into said reservoir via said injection well and simultaneously producing said reservoir from said production well to a point where the rate of oil production has reached a predetermined termination point; and
   e. Thereafter repeating steps (a) and (b), to the point where the abandonment pressure of the reservoir is reached.

2. The method of claim 1 wherein step (a) is preceded by the step of repressuring said reservoir to the bubble point pressure of said reservoir.

3. The method of claim 1 wherein said water injected into said reservoir contains a thickening agent thereby to improve the mobility ratio during said water injection steps.

4. The method of claim 1 wherein the critical gas saturation at termination of said solution gas drive step is within the range of about 2 to about 10 percent of the void volume of said reservoir at said reservoir pressure.